(12) United States Patent
Field

(10) Patent No.: US 10,523,595 B2
(45) Date of Patent: Dec. 31, 2019

(54) APPLICATION PORT MANAGEMENT

(71) Applicant: COMCAST CABLE COMMUNICATIONS, LLC, Philadelphia, PA (US)

(72) Inventor: Brian Field, Evergreen, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 760 days.

(21) Appl. No.: 14/243,644

(22) Filed: Apr. 2, 2014

(65) Prior Publication Data
US 2015/0288621 A1 Oct. 8, 2015

(51) Int. Cl.
*H04L 29/06* (2006.01)
*H04L 12/937* (2013.01)

(52) U.S. Cl.
CPC .................................. *H04L 49/253* (2013.01)

(58) Field of Classification Search
CPC .................................................... H04L 49/253
USPC ......................................................... 709/223
See application file for complete search history.

(56) References Cited

U.S. PATENT DOCUMENTS

| | | | | |
|---|---|---|---|---|
| 6,330,560 B1* | 12/2001 | Harrison | ................. | H04L 41/28 707/704 |
| 8,136,155 B2* | 3/2012 | Freund | ................. | H04L 63/104 726/22 |
| 2002/0078377 A1* | 6/2002 | Chang | ................. | H04L 63/0218 726/13 |
| 2005/0282532 A1* | 12/2005 | Dotan | ................. | G06F 9/45504 455/418 |
| 2006/0277275 A1* | 12/2006 | Glaenzer | ............... | H04L 67/125 709/219 |
| 2007/0061433 A1* | 3/2007 | Reynolds | ............ | H04L 12/2602 709/223 |
| 2008/0089324 A1* | 4/2008 | Polk | ...................... | H04L 65/608 370/389 |
| 2008/0178278 A1* | 7/2008 | Grinstein | ............ | H04L 63/0227 726/12 |
| 2008/0184344 A1* | 7/2008 | Hernacki | ................ | G06F 21/31 726/4 |
| 2009/0064194 A1* | 3/2009 | Turk | ...................... | G06F 9/5027 719/319 |
| 2009/0106834 A1* | 4/2009 | Borzycki | .............. | H04L 63/166 726/21 |
| 2010/0070972 A1* | 3/2010 | Kumagai | ............ | G06F 9/45504 718/1 |
| 2011/0299413 A1* | 12/2011 | Chatwani | ............ | H04L 12/4625 370/252 |

(Continued)

*Primary Examiner* — Moustafa M Meky
*Assistant Examiner* — Elizabeth Kassa
(74) *Attorney, Agent, or Firm* — BakerHostetler

(57) ABSTRACT

A computing platform executing an application may receive a response to a request for opening a network port for utilization by the application from a computing platform distinct from the computing platform executing the application. The computing platform executing the application may determine whether to open the network port for utilization by the application based on the response to the request. In some embodiments, the application may invoke at least one call to an application program interface (API) of an operating system (OS) running on the computing platform executing the application, and the request may be generated responsive to the at least one call to the API of the OS.

20 Claims, 12 Drawing Sheets

(56) References Cited

U.S. PATENT DOCUMENTS

| | | | | |
|---|---|---|---|---|
| 2013/0332399 A1* | 12/2013 | Reddy | .................. | G06N 99/005 |
| | | | | 706/12 |
| 2013/0332602 A1* | 12/2013 | Nakil | ................... | G06N 99/005 |
| | | | | 709/224 |
| 2014/0181310 A1* | 6/2014 | Gentile | ..................... | G06F 9/54 |
| | | | | 709/226 |

* cited by examiner

APPLICATION PORT MANAGEMENT

BACKGROUND

Computer applications are used to provide a wide variety of services and functionality. Modern computer applications often utilize one or more network protocols to communicate between networked computing devices or platforms. These protocols commonly employ various ports to identify network traffic or communications that are associated with a particular application. Computing platforms, computing devices, and network devices may be configured to identify network traffic or communications based on port information contained therein, and may process the network traffic or communications accordingly. For example, a network device may be configured to filter traffic based on port information contained therein (e.g., in an effort to improve performance, conserve resources, and/or increase security).

One approach for processing network traffic or communications based on ports is to employ a network device configured with an access control list (ACL) that specifies how network traffic or communications associated with particular ports should be processed. When operating parameters change, however, such an ACL must be reconfigured to reflect the new parameters. In an environment where operating parameters frequently change, reconfiguring ACLs to reflect changes in operating parameters can become a burdensome, and frequently infeasible, task. Accordingly, a need exists for application port management.

SUMMARY

This disclosure relates to application port management. Embodiments are provided that manage the opening of application ports for requesting applications. Applications that are authorized to open a port may be allowed to open a port, while applications that are not authorized may have their requests to open a port denied. For example, a computing platform executing an application may receive a response to a request for opening a network port for utilization by the application. The response may be received from a computing platform distinct from the computing platform executing the application. The computing platform executing the application may determine whether to open the network port based on the response. In some embodiments, the application may invoke at least one call to an application program interface (API) of an operating system (OS) running on the computing platform executing the application, and the request may be generated responsive to the at least one call.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
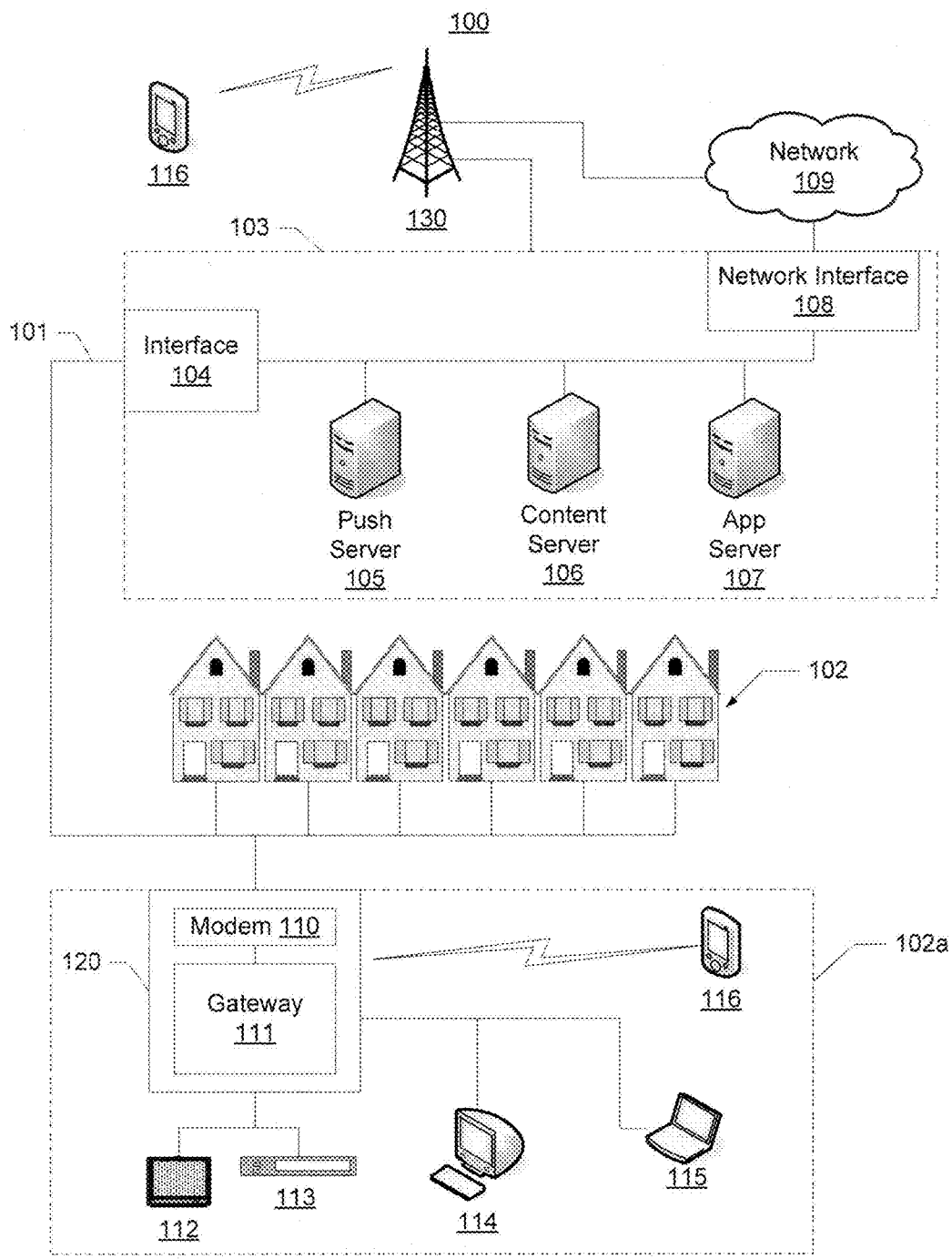
FIG. 1 depicts an illustrative network environment in which one or more aspects of the disclosure may be implemented.

FIG. 1 illustrates an example information distribution network 100 in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server 105 (e.g. a push server), a server 106 (e.g., a content server), and a server 107 (e.g., an application server). For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like) or any other device.

Figure 2:
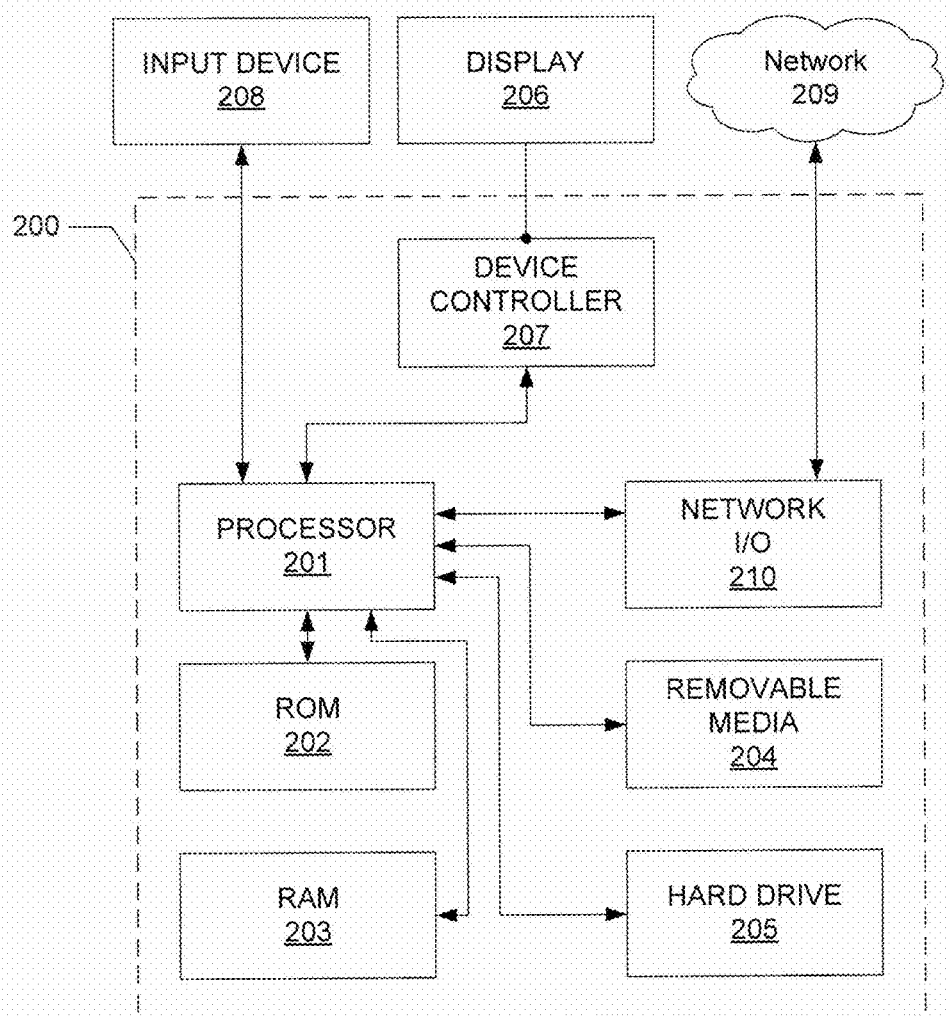
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with an network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
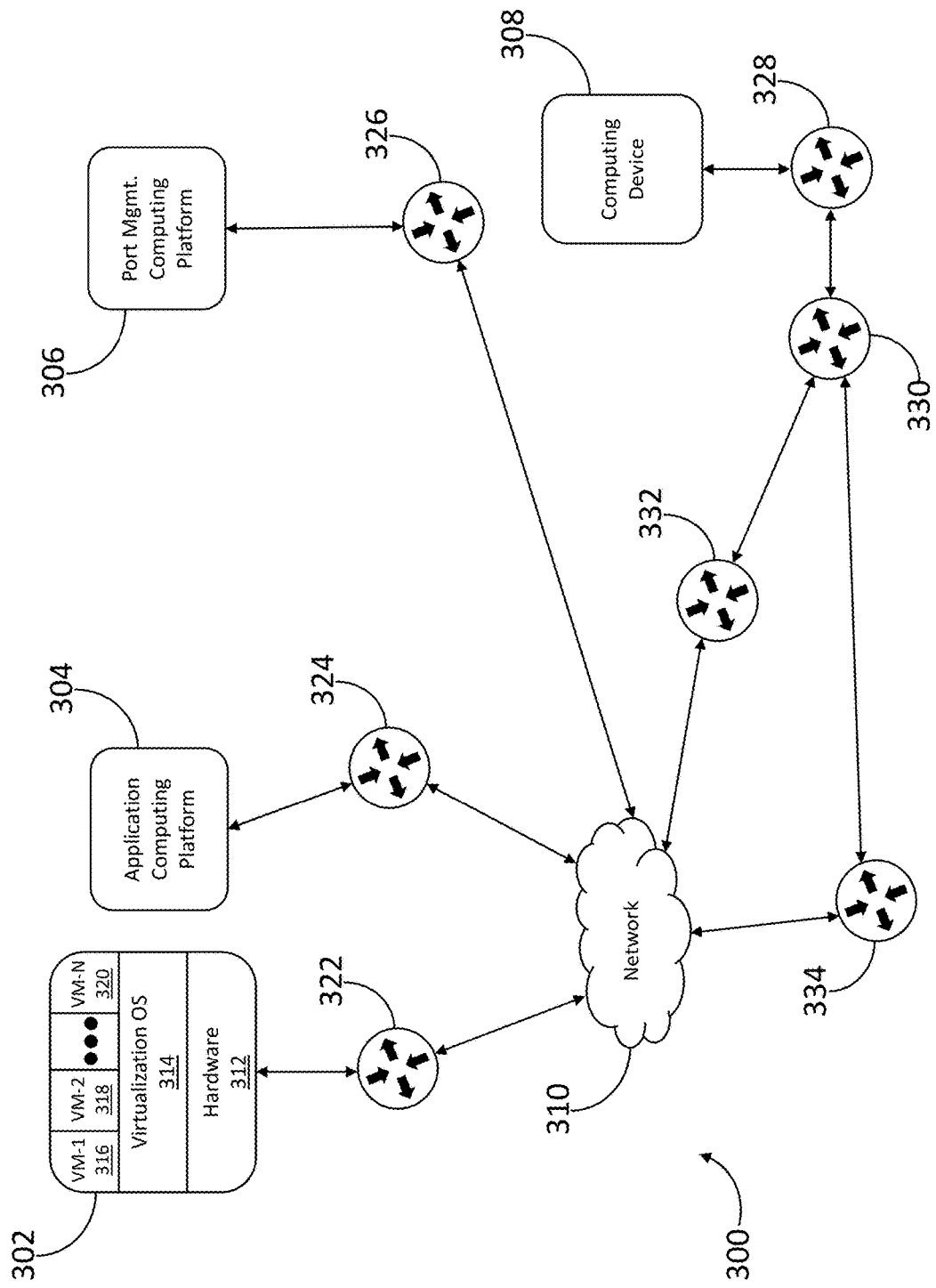
FIG. 3 depicts an illustrative computing environment for employing systems and methods in accordance with one or more aspects of the disclosure.

FIG. 3 depicts an illustrative computing environment for employing systems and methods in accordance with one or more aspects of the disclosure. Referring to FIG. 3, a computing environment 300 may include one or more computing platforms and/or computing devices. For example, the computing environment 300 may include an application computing platform 302 and an application computing platform 304, a port management computing platform 306, and a computing device 308. One or more of the application computing platforms 302 and 304, the port management computing platform 306, and/or the computing device 308 may be interconnected via one or more networks. For example, a network 310 may interconnect the application computing platforms 302 and 304, the port management computing platform 306, and the computing device 308. The network 310 may include one or more sub-networks (e.g., local area networks (LANs), wide area networks (WANs), or the like). The computing device 308 may be any type of computing device capable of communicating with one or more other computing devices and/or computing platforms (e.g., the application computing platforms 302 and/or 304 via the network 310). For example, the computing device 308 may be a laptop computer, desktop computer, tablet computer, smart phone, set-top box, or the like. The application computing platforms 302 and 304 and the port management computing platform 306 may be any type of computing platform capable of communicating with one or more other computing devices and/or computing platforms (e.g., one or more of the application computing platforms 302 and 304, the port management computing platform 306, and/or the computing device 308 via the network 310). For example, the application computing platforms 302 and 304, and the port management computing platform 306 may include one or more servers. The application computing platforms 302 and 304, the port management computing platform 306, and/or the computing device 308 may each include one or more processors and a memory comprising executable instructions that when executed by the one or more processors cause the performance of one or more functions described herein.

In some embodiments, one or more of the application computing platforms 302 and 304 may include a virtualization computing platform. For example, the application computing platform 302 may include hardware 312 and a virtualization OS 314. The virtualization OS 314 may be configured to host one or more virtual machines and mediate access to the hardware 312 by the one or more virtual machines. For example, the virtualization OS 314 may be configured to host virtual machines 316 and 318 through 320, and mediate access to the hardware 312 by one or more of the virtual machines 316 and 318 through 320. The virtualization OS 314 may be any type of virtualization platform OS. For example, the virtualization OS 314 may support full virtualization, partial virtualization, and/or paravirtualization.

The computing environment 300 may also include one or more network devices (e.g., switches, routers, gateway network devices, or the like). For example, the computing environment 300 may include network devices 322, 324, 326, 328, 330, 332, and 334. The network device 322 may interconnect the application computing platform 302 and the network 310. Similarly, the network device 324 may interconnect the application computing platform 304 and the network 310; the network device 326 may interconnect the port management computing platform 306 and the network 310; and the network devices 328, 330, 332, and 334 may interconnect the computing device 308 and the network 310.

As will be described in greater detail below, in accordance with one or more aspects of the disclosure, a computing platform executing an application may receive a response to a request for opening a network port for utilization by the application from a computing platform distinct from the computing platform executing the application. For example, the application computing platform 302 may be executing an application that may request a network port be opened for communication with the computing device 308. The application computing platform 302 may generate a request for opening the network port, may send the request to the port management computing platform 306, and may receive a response to the request from the port management computing platform 306. The computing platform executing the application may determine whether to open the network port for utilization by the application based on the response. For example, the application computing platform 302 may determine whether to open the network port based on the response.

Figure 4A:
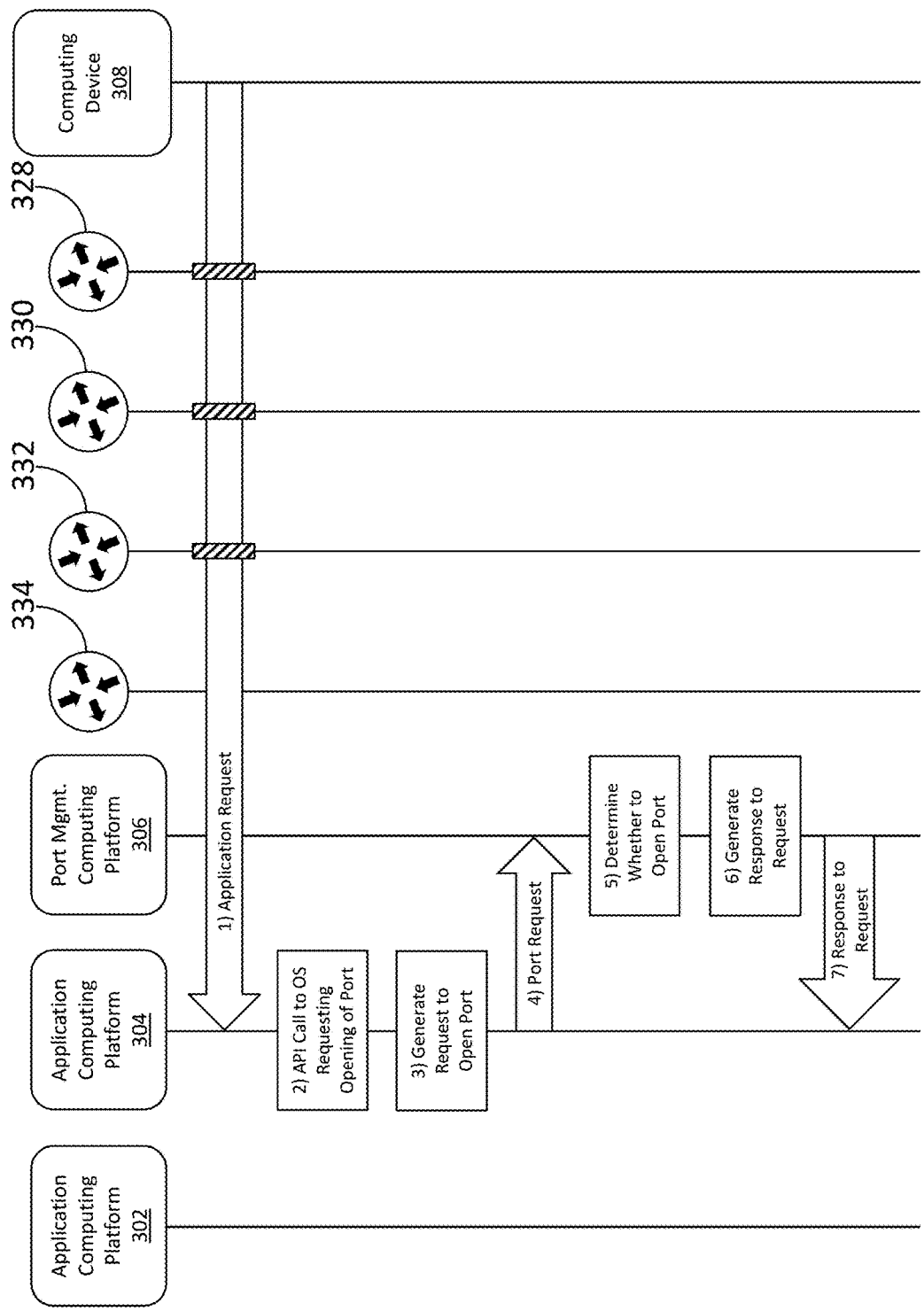
FIGS. 4A, 4B, 4C, 4D, and 4E depict an illustrative event sequence in accordance with one or more aspects of the disclosure.

FIGS. 4A, 4B, 4C, 4D, and 4E depict an illustrative event sequence in accordance with one or more aspects of the disclosure. The events and steps illustrated in FIGS. 4A, 4B, 4C, 4D, and 4E are merely illustrative, and one of ordinary skill in the art will recognize that not every step or event may be required and that some steps or events may be performed or occur in an order other than that illustrated. Referring to FIG. 4A, at step 1, the application computing platform 304 may receive a request associated with an application executing on the application computing platform 304 from the computing device 308. For example, the application computing platform 304 may receive a request for a service associated with an application executing on the application computing platform 304 from the computing device 308. As denoted by the shaded regions over the lines extending from the network devices 328, 330, and 332, the request may be communicated via the network devices 328, 330, and 332. At step 2, the application executing on the application computing platform 304 may invoke at least one call to an API of an OS running on the application computing platform 304. The at least one call to the API of the OS running on the application computing platform 304 may request opening of a network port (e.g., for Internet Protocol (IP) version 4 or 6, raw socket access, other protocols and/or versions, or the like) for utilization by the application (e.g., a socket, bind, or connect call to an API of the OS, or the like). For example, the application executing on the application computing platform 304 may invoke one or more calls to an API of an OS executing on the application computing platform 304 requesting opening of a network port for utilization by the application executing on the application computing platform 304 (e.g., for communication with the computing device 308).

In some embodiments, invoking the at least one call to the API of the OS may include sending, by the application and via the at least one call to the API of the OS, one or more parameters comprising a transport protocol for the network port, a source network address for the network port, a source port number for the network port, a remote network address for the network port, and/or a remote port number for the network port. For example, the application executing on the application computing platform 304 may send via the API call(s) to the OS executing on the application computing platform 304 a parameter comprising a transport protocol for the requested network port (e.g., user datagram protocol (UDP), transmission control protocol (TCP), or the like), a parameter comprising a source network address for the requested network port (e.g., a network address associated with the application computing platform 304), a parameter comprising a source port number for the requested network port (e.g., a port number associated with the application executing on the application computing platform 304), a parameter comprising a remote network address for the requested network port (e.g., a network address associated with the computing device 308), and/or a parameter comprising a remote port number for the requested network port (e.g., a port number associated with an application executing on the computing device 308).

At step 3, in response to the at least one call to the API of the OS running on the application computing platform 304 requesting opening of the network port, the application computing platform 304 may generate a request for opening the network port. For example, the application computing platform 304 may utilize the parameter(s) comprising the transport protocol, the source network address, the source port number, the remote network address, and/or the remote port number to generate a request for opening the network port. The request may include the transport protocol, the source network address, the source port number, the remote network address, and/or the remote port number. In some embodiments, the request may be generated by a trusted layer (e.g., a trusted OS (or layer thereof) running on the application computing platform 304.

At step 4, the application computing platform 304 may send the request to the port management computing platform 306. At step 5, the port management computing platform 306 may utilize information from the request to make a determination regarding whether to open the network port. For example, the port management computing platform 306 may be provisioned with one or more rules indicating that a network port should be opened for a request comprising the transport protocol for the requested network port (e.g., UDP, TCP, or the like), a source network address associated with the application computing platform 304, a source port number associated with the application executing on the application computing platform 304, a remote network address associated with the computing device 308, and a remote port number associated with the application executing on the computing device 308. The port management computing platform 306 may determine, based on the one or more rules, that the requested network port should be opened. In some embodiments, the port management computing platform 306 may utilize dynamic information to determine whether the requested network port should be opened. For example, the port management computing platform 306 may determine whether the requested network port should be opened based on the time of day, current network load, or the like.

Figure 4B:
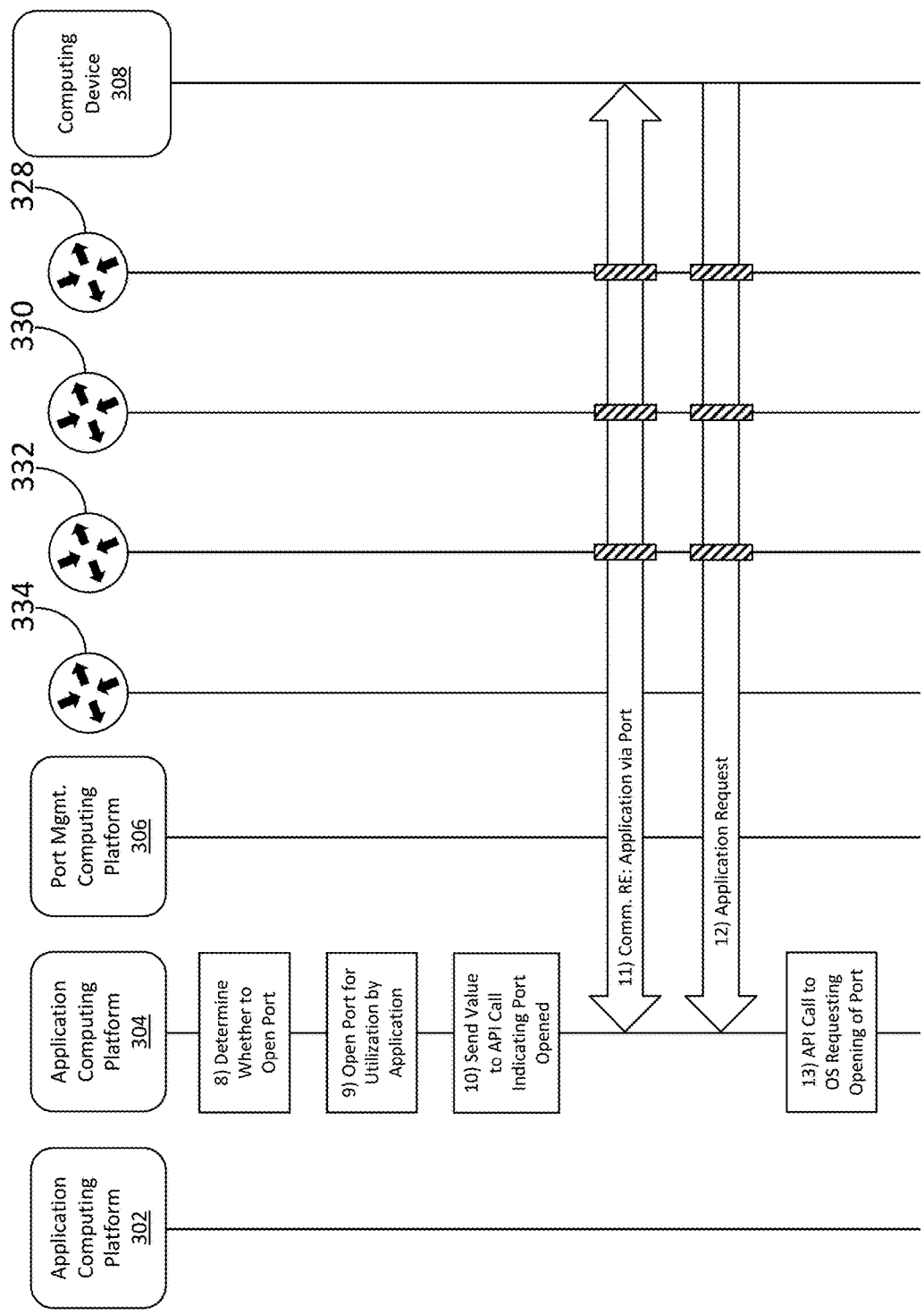

At step 6, the port management computing platform 306 may generate a response to the request (e.g., a response indicating that the network port should be opened. At step 7, the port management computing platform 306 may send the response to the request to the application computing platform 304. Referring to FIG. 4B, at step 8, the application computing platform 304 may determine, based on the response, whether to open the network port. For example, the application computing platform 304 may determine, based on the response indicating that the network port should be opened, to open the network port.

Responsive to determining to open the network port, at step 9, the application computing platform 304 may open the network port. For example, the OS running on the application computing platform 304 may open the network port (e.g., a network port having the transport protocol for the requested network port (e.g., UDP, TCP, or the like), the source network address associated with the application computing platform 304, the source port number associated with the application executing on the application computing platform 304, the remote network address associated with the computing device 308, and the remote port number associated with the application executing on the computing device 308). At step 10, the API of the OS executing on the application computing platform 304 may send to the application executing on the application computing platform 304 a value indicating that the network port has been opened (e.g., a value that the application will recognize as indicating that the requested network port has been opened). At step 11, the application executing on the application computing platform 304 and the application executing on the computing device 308 may communicate via the opened network port (e.g., via the network devices 328, 330, and 332).

At step 12, the application computing platform 304 may receive a request associated with an application executing on the application computing platform 304 from the computing device 308. For example, the application computing platform 304 may receive a request for a service associated with an application executing on the application computing platform 304 from the computing device 308. As denoted by the shaded regions over the lines extending from the network devices 328, 330, and 332, the request may be communicated via the network devices 328, 330, and 332. At step 13, the application executing on the application computing platform 304 may invoke at least one call to an API of an OS running on the application computing platform 304. The at least one call to the API of the OS running on the application computing platform 304 may request opening of a network port for utilization by the application (e.g., a socket, bind, or connect call to an API of the OS, or the like). For example, the application executing on the application computing platform 304 may invoke one or more calls to an API of an OS executing on the application computing platform 304 requesting opening of a network port for utilization by the application (e.g., for communication with the computing device 308).

As indicated above, in some embodiments, invoking the at least one call to the API of the OS may include sending, by the application and via the at least one call to the API of the OS, one or more parameters comprising a transport protocol for the network port, a source network address for the network port, a source port number for the network port, a remote network address for the network port, and a remote port number for the network port. For example, the application executing on the application computing platform 304 may send via the API call(s) to the OS executing on the application computing platform 304 a parameter comprising a transport protocol for the requested network port (e.g., UDP, TCP, or the like), a parameter comprising a source network address for the requested network port (e.g., a network address associated with the application computing platform 304), a parameter comprising a source port number for the requested network port (e.g., a port number associated with the application executing on the application computing platform 304), a parameter comprising a remote network address for the requested network port (e.g., a network address associated with the computing device 308), and/or a parameter comprising a remote port number for the requested network port (e.g., a port number associated with an application executing on the computing device 308). Additionally or alternatively, invoking the at least one call to the API of the OS may include sending, by the application and via the at least one call to the API of the OS, one or more parameters comprising a DSCP value for the network port and/or one or more parameters comprising segment routing header information for the network port. For example, the application executing on the application computing platform 304 may send via the API call(s) to the OS executing on the application computing platform 304 a parameter comprising a DSCP value for the requested network port (e.g., a DSCP value indicating that communications via the requested network port should be accorded an elevated level of quality of service (QoS)).

Figure 4C:
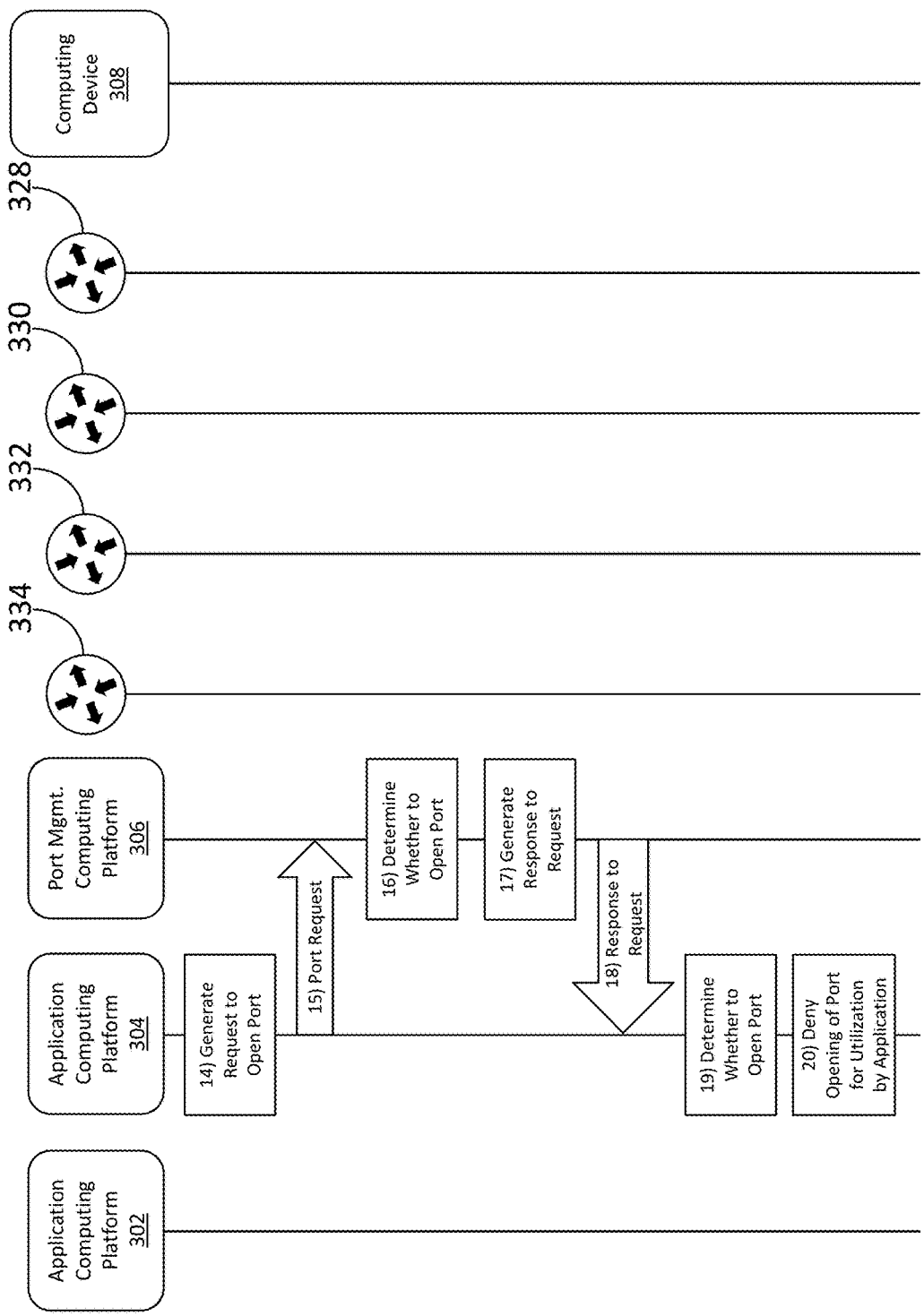

Referring to FIG. 4C, at step 14, in response to the at least one call to the API of the OS running on the application computing platform 304 requesting opening of the network port, the application computing platform 304 may generate a request for opening the network port. For example, the application computing platform 304 may utilize the parameter(s) comprising the transport protocol for the requested network port, the source network address for the requested network port, the source port number for the requested network port, the remote network address for the requested network port, the remote port number for the requested network port, the DSCP value for the requested network port, and/or the segment routing header information for the requested network port to generate a request for opening the network port. The request may include the transport protocol, the source network address, the source port number, the remote network address, the remote port number, the DSCP value, and/or the segment routing header information.

At step 15, the application computing platform 304 may send the request to the port management computing platform 306. At step 16, the port management computing platform 306 may utilize information from the request to make a determination regarding whether to open the network port. For example, the port management computing platform 306 may be provisioned with one or more rules indicating that a network port should not be opened for a request comprising the transport protocol for the requested network port (e.g., UDP, TCP, or the like), a source network address associated with the application computing platform 304, a source port number associated with the application executing on the application computing platform 304, a remote network address associated with the computing device 308, a remote port number associated with the application executing on the computing device 308, and a DSCP value indicating that communications via the requested network port should be accorded an elevated level of QoS, and the port management computing platform 306 may determine, based on the one or more rules, not to open the requested network port.

Figure 4D:
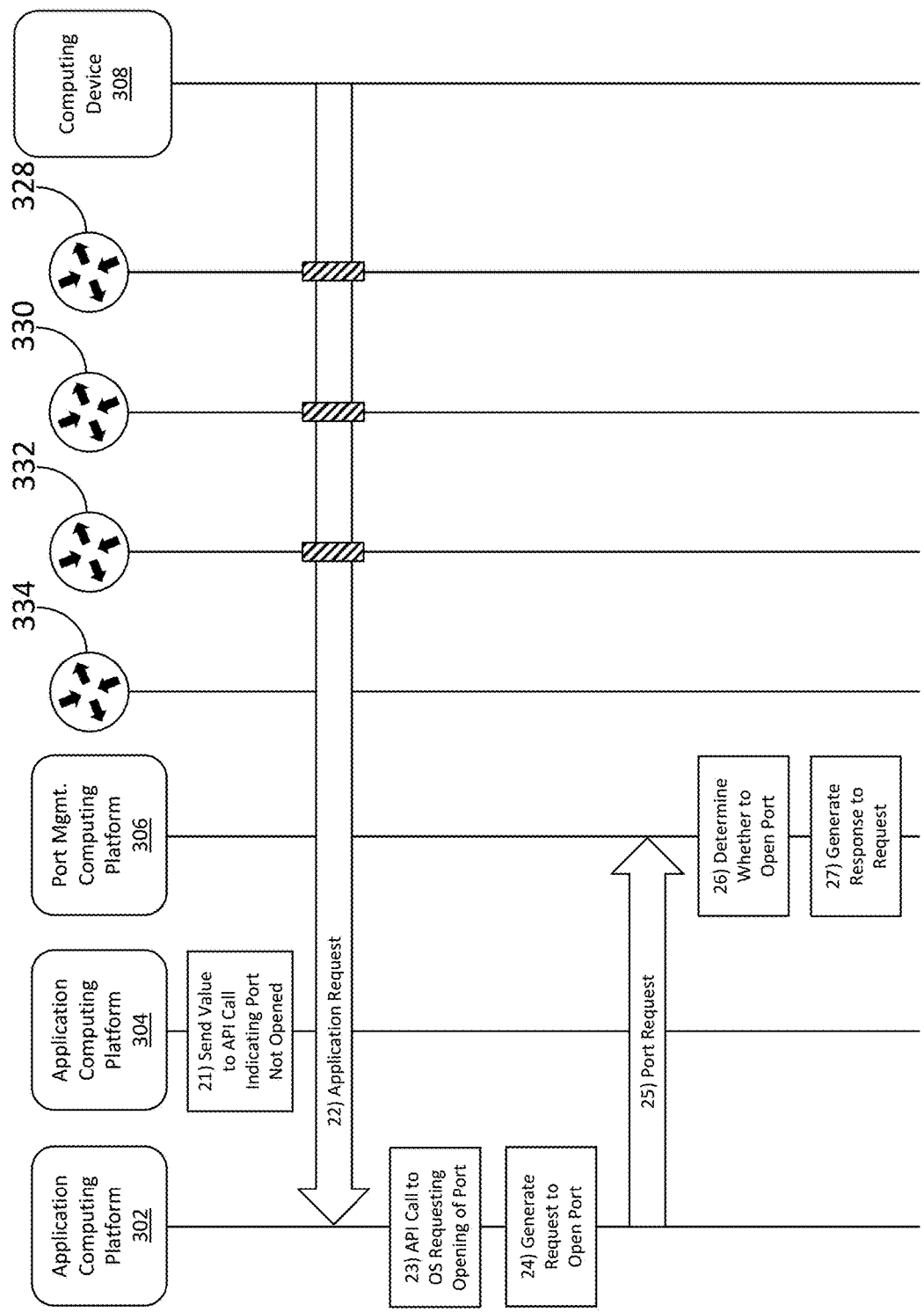

At step 17, the port management computing platform 306 may generate a response to the request (e.g., a response indicating that the network port should not be opened). At step 18, the port management computing platform 306 may send the response to the application computing platform 304. At step 19, the application computing platform 304 may determine, based on the response, whether to open the network port. For example, the application computing platform 304 may determine, based on the response indicating that the network port should not be opened, to not open the network port. Responsive to determining not to open the network, at step 20, the application computing platform 304 may deny opening of the network port. For example, the OS running on the application computing platform 304 may deny opening of the network port (e.g., a network port having the transport protocol for the requested network port (e.g., UDP, TCP, or the like), the source network address associated with the application computing platform 304, the source port number associated with the application executing on the application computing platform 304, the remote network address associated with the computing device 308, the remote port number associated with the application executing on the computing device 308, and the DSCP value indicating that communications via the requested network port should be accorded an elevated level of QoS). Referring to FIG. 4D, at step 21, the API of the OS executing on the application computing platform 304 may send to the application executing on application computing platform 304 a value indicating that the network port was not opened (e.g., a value that the application will recognize as indicating that the requested network port was not opened). In some embodiments, the port management computing platform 306 may generate a response encoding multiple acceptable DSCP values (e.g., by utilizing a regular expression) thereby enabling the application computing platform 304 to grant subsequent requests to open network ports (e.g., requests having DSCP value(s) that match criteria of the regular expression) without having to request further authorization from the port management computing platform 306.

At step 22, the application computing platform 302 may receive a request associated with an application executing on the application computing platform 302 from the computing device 308. For example, the application computing platform 302 may receive a request for a service associated with an application executing on the application computing platform 302 from the computing device 308. As denoted by the shaded regions over the lines extending from the network devices 328, 330, and 332, the request may be communicated via the network devices 328, 330, and 332. At step 23, the application executing on the application computing platform 302 may invoke at least one call to an API of an OS running on the application computing platform 302. The at least one call to the API of the OS running on the application computing platform 302 may request opening of a network port for utilization by the application (e.g., a socket, bind, or connect call to an API of the OS, or the like). For example, the application executing on the application computing platform 302 may invoke one or more calls to an API of an OS executing on the application computing platform 302 requesting opening of a network port for utilization by the application executing on the application computing platform 302 (e.g., for communication with the computing device 308). As indicated above, the application computing platform 302 may be a virtualization computing platform, and the virtualization OS 314 may be configured to host the virtual machines 316 and 318 through 320, and mediate access to the hardware 312 by one or more of the virtual machines 316 and 318 through 320. For example, the virtualization OS 314 may host the virtual machines 316 and 318 through 320, and the application executing on the computing platform 302 (e.g., the application associated with the port request) may be executing within the virtual machine 316.

In some embodiments, invoking the at least one call to the API of the OS running on the application computing platform 302 may include the application executing within the virtual machine 316 invoking at least one call to an API of an OS executing within the virtual machine 316, and the OS executing within the virtual machine 316 invoking at least one call to an API of the virtualization OS 314. For example, the virtualization OS 314 may be configured for paravirtualization, the application executing within the virtual machine 316 may invoke at least one call to an API associated with the virtual machine 316 (e.g., to a "front-end" API library), and the API associated with the virtual machine 316 may invoke at least one call to an API associated with the virtualization OS 314 (e.g., to a "back-end" API library). In such embodiments, invoking the at least one call to the API of the OS executing within the virtual machine 316 may include the application executing within the virtual machine 316 sending, to the OS executing within the virtual machine 316, one or more parameters comprising a transport protocol for the requested network port (e.g., UDP, TCP, or the like), a source network address for the requested network port (e.g., a network address associated with the virtual machine 316), a source port number for the requested network port (e.g., a port number associated with the application executing within the virtual machine 316), a remote network address for the requested network port (e.g., a network address associated with the computing device 308), and/or a remote port number for the requested network port (e.g., a port number associated with an application executing on the computing device 308). The OS executing within the virtual machine 316 may send, to the virtualization OS 314, the parameter(s) comprising the transport protocol for the requested network port (e.g., UDP, TCP, or the like), the source network address for the requested network port (e.g., the network address associated with the virtual machine 316), the source port number for the requested network port (e.g., the port number associated with the application executing within the virtual machine 316), the remote network address for the requested network port (e.g., the network address associated with the computing device 308), and/or the remote port number for the requested network port (e.g., the port number associated with the application executing on the computing device 308).

Additionally or alternatively, invoking the at least one call to the API of the OS executing within the virtual machine 316 may include the application executing within virtual the virtual machine 316 sending to the OS executing within the virtual machine 316 one or more parameters comprising a DSCP value for the requested network port (e.g., a DSCP value indicating that communications via the requested network port should be accorded an elevated level of QoS) and/or segment routing header information for the requested network port (e.g., segment routing header information indicating that communications via the requested network port should be routed via the network devices 328, 330, and 334). The OS executing within the virtual machine 316 may send, to the virtualization OS 314, the parameter(s) comprising the DSCP value for the requested network port (e.g., the DSCP value indicating that communications via the requested network port should be accorded an elevated level of QoS) and/or the segment routing header information for the requested network port (e.g., the segment routing header information indicating that communications via the requested network port should be routed via the network devices 328, 330, and 334).

At step 24, in response to the at least one call to the API of the OS running on the application computing platform 302 requesting opening of the network port for utilization by the application executing on the application computing platform 302 (e.g., the application executing within the virtual machine 316), the application computing platform 302 may generate a request for opening the network port. For example, the application computing platform 302 may utilize the parameter(s) comprising the transport protocol, the source network address, the source port number, the remote network address, the remote port number, the DSCP value, and/or the segment routing header information to generate a request for opening the network port. The request may include the transport protocol, the source network address, the source port number, the remote network address, the remote port number, the DSCP value, and/or the segment routing header information.

At step 25, the application computing platform 302 may send the request to the port management computing platform 306. At step 26, the port management computing platform 306 may utilize information from the request to make a determination regarding whether to open the network port. For example, the port management computing platform 306 may be provisioned with one or more rules indicating that a network port should be opened for a request comprising the transport protocol for the requested network port (e.g., UDP, TCP, or the like), a source network address associated with the virtual machine 316, a source port number associated with the application executing within the virtual machine 316, a remote network address associated with the computing device 308, a remote port number associated with the application executing on the computing device 308, and segment routing header information indicating that communications via the requested network port should be routed via the network devices 328, 330, and 334. The port management computing platform 306 may determine, based on the one or more rules, that the requested network port should be opened.

Figure 4E:
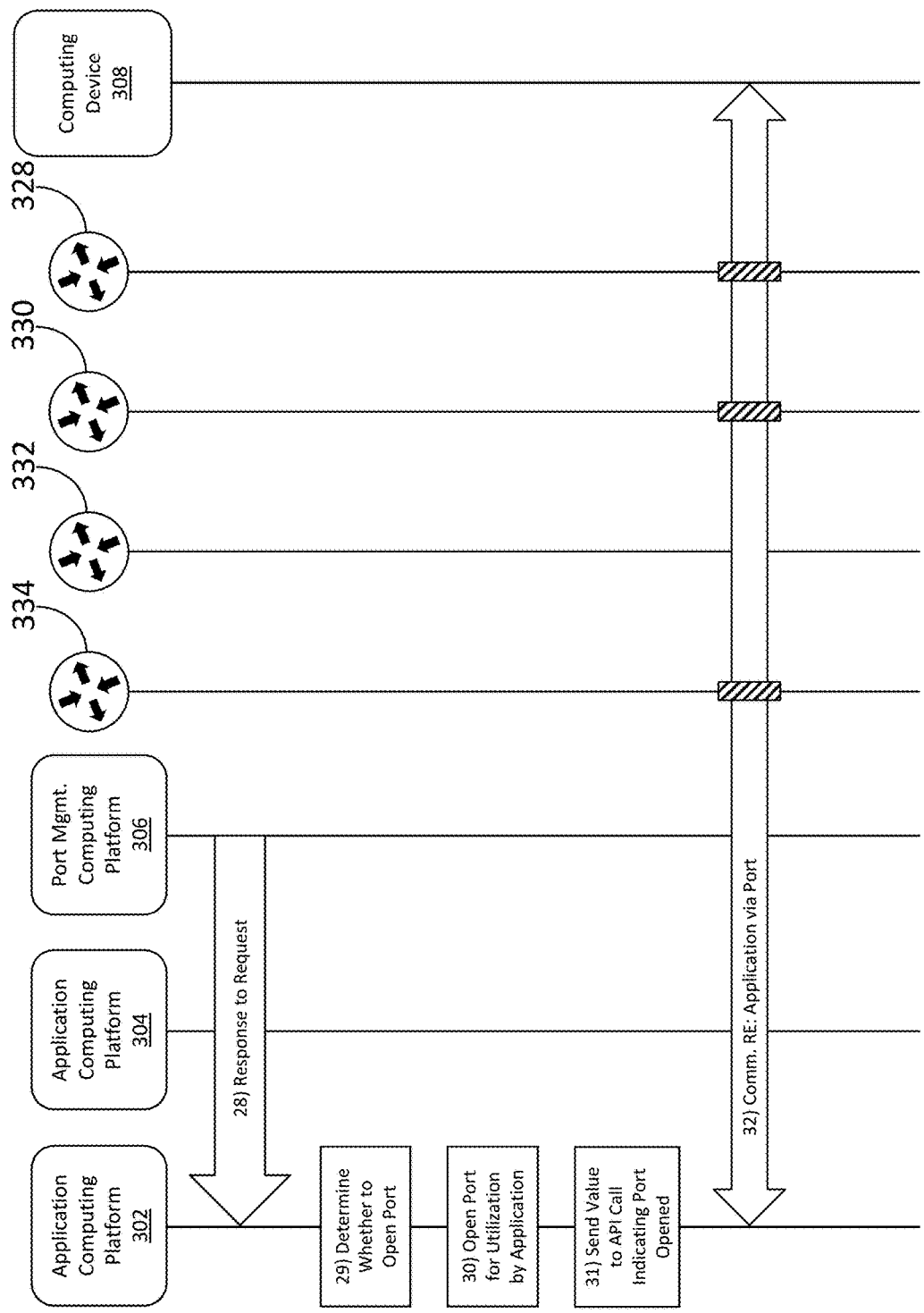

At step 27, the port management computing platform 306 may generate a response to the request (e.g., a response indicating that the network port should be opened). Referring to FIG. 4E, at step 28, the port management computing platform 306 may send the response to the application computing platform 302. At step 29, the application computing platform 302 may determine, based on the response, whether to open the network port. For example, the application computing platform 302 may determine, based on the response indicating that the network port should be opened, to open the network port.

Responsive to determining to open the network port, at step 30, the application computing platform 302 may open the network port. For example, the virtualization OS 314 may open the network port (e.g., a network port having the transport protocol for the requested network port (e.g., UDP, TCP, or the like), the source network address associated with the virtual machine 316, the source port number associated with the application executing within the virtual machine 316, the remote network address associated with the computing device 308, and the remote port number associated with the application executing on the computing device 308) for utilization by the application executing within the virtual machine 316. Additionally or alternatively, the application computing platform 302 may configure the network port to utilize segment routing header information indicating that communications via the network port should be routed via the network devices 328, 330, and 334. At step 31, the API of the virtualization OS 314 may send to the application executing within the virtual machine 316 (e.g., via the API of the OS executing within the virtual machine 316) a value indicating that the network port has been opened (e.g., a value that the application will recognize as indicating that the requested network port has been opened). At step 32, the application executing within the virtual machine 316 and the application executing on the computing device 308 may communicate via the opened network port pursuant to the segment routing header information (e.g., via the network devices 328, 330, and 334).

Figure 5A:
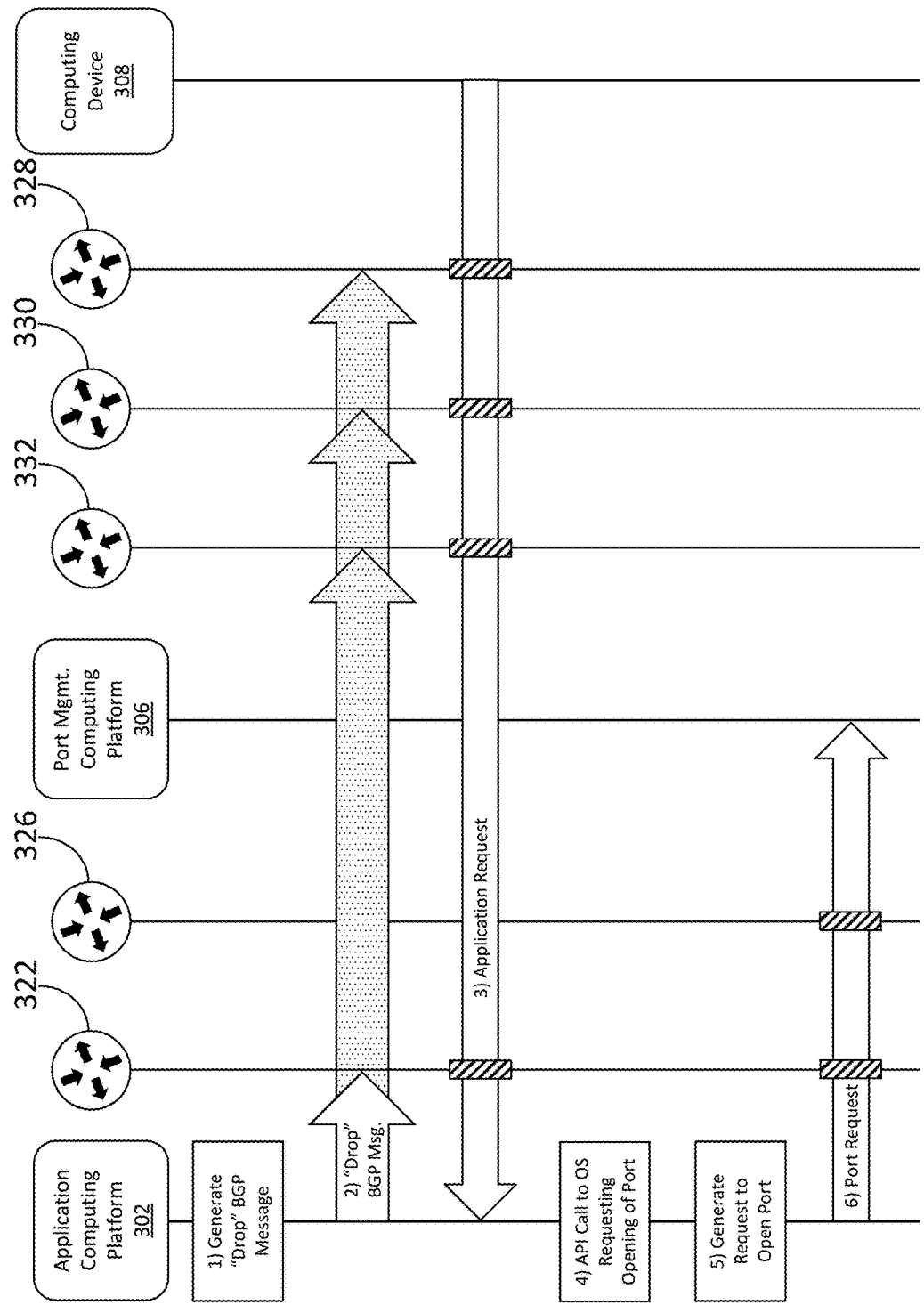
FIGS. 5A, 5B, and 5C depict an additional illustrative event sequence in accordance with one or more aspects of the disclosure.
Figure 5B:
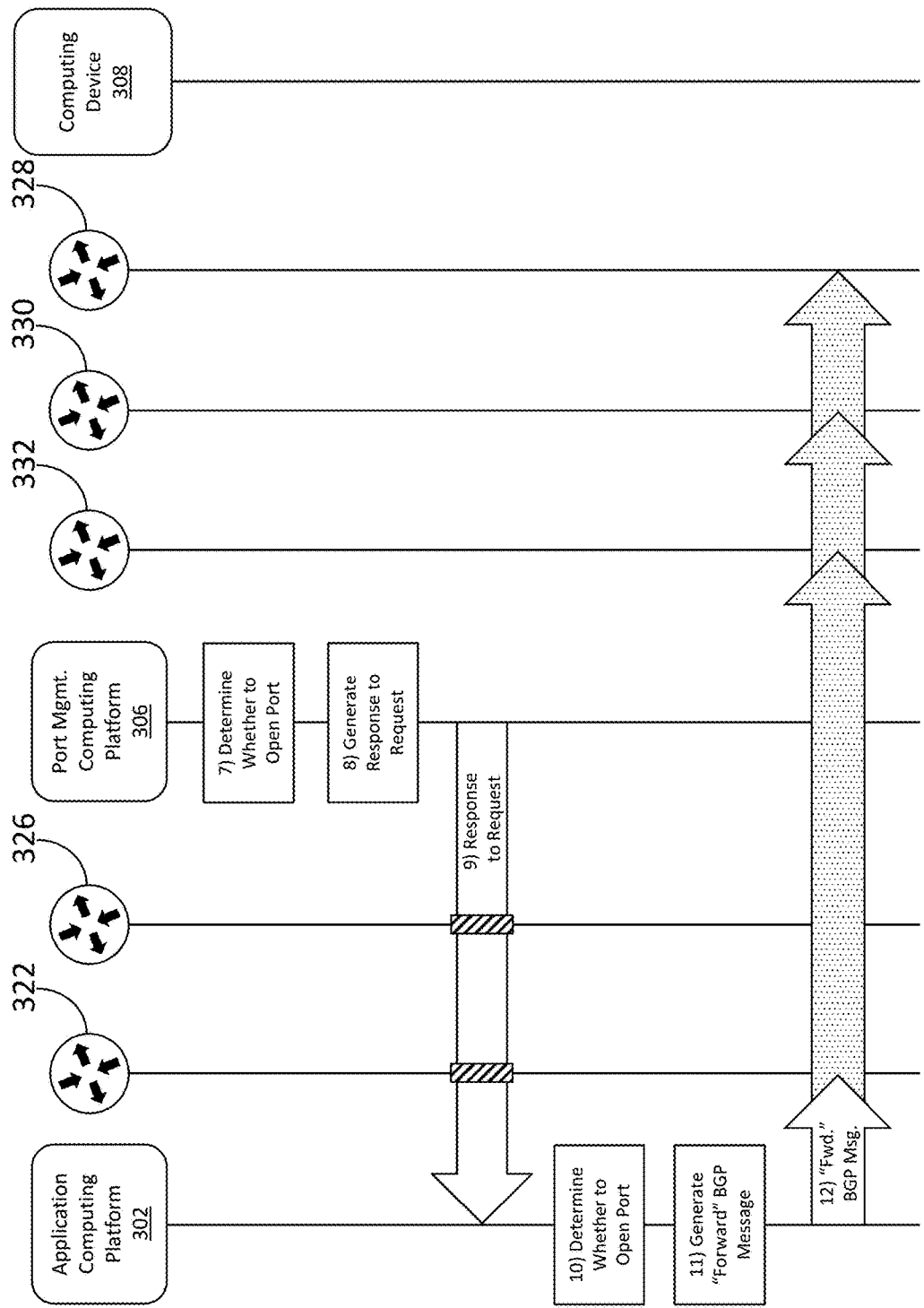
Figure 5C:
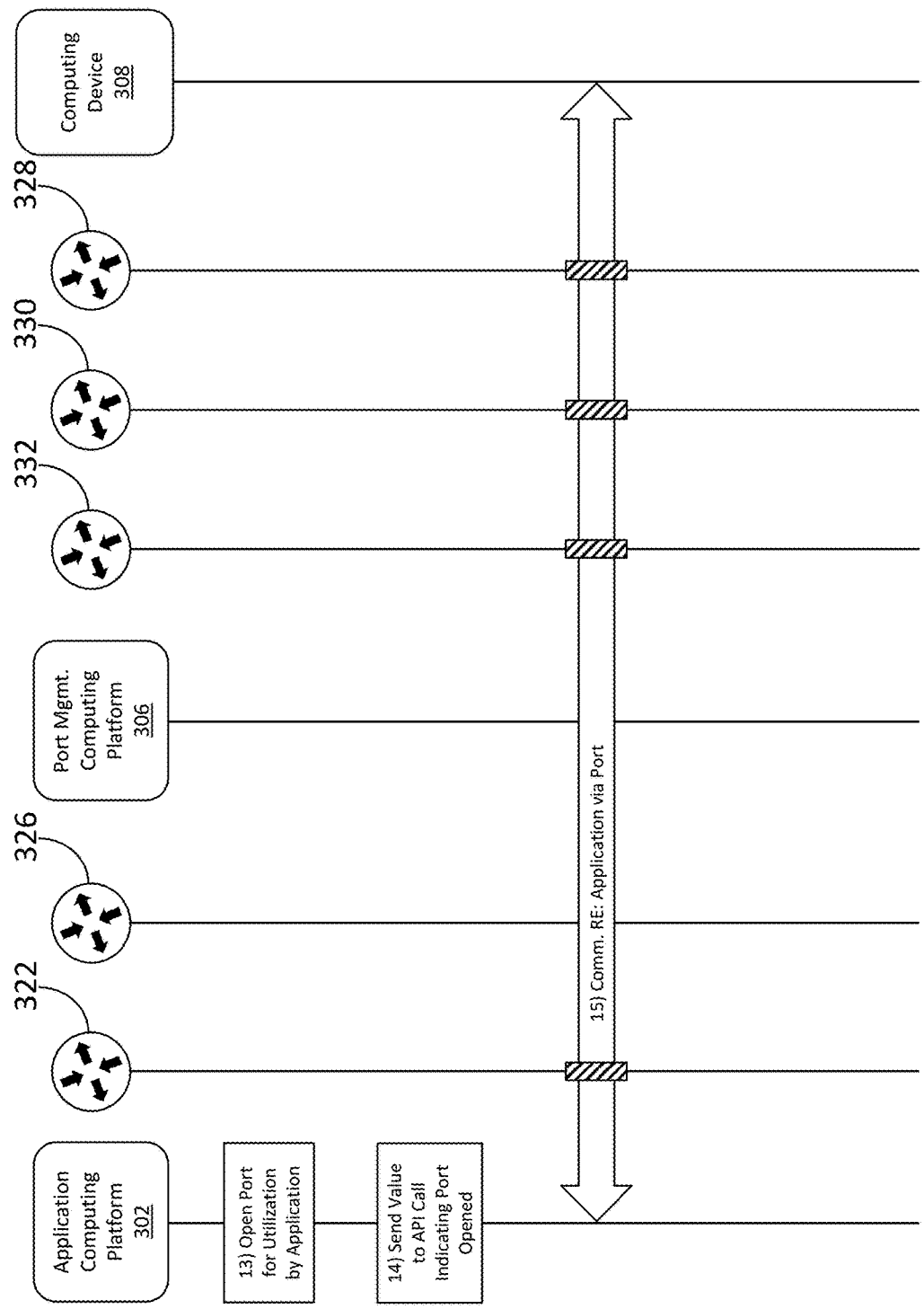

FIGS. 5A, 5B, and 5C depict an additional illustrative event sequence in accordance with one or more aspects of the disclosure. The events and steps illustrated in FIGS. 5A, 5B, and 5C are merely illustrative, and one of ordinary skill in the art will recognize that not every step or event may be required and that some steps or events may be performed or occur in an order other than that illustrated. Referring to FIG. 5A, at step 1, the application computing platform 302 may generate a border gateway protocol (BGP) message comprising at least one network address associated with the application computing platform 302, one or more other network addresses or port numbers, and a drop action. For example, as indicated above, the application computing platform 302 may be a virtualization computing platform, and the virtualization OS 314 may be configured to host the virtual machines 316 and 318 through 320. When the virtualization OS 314 initializes the virtual machine 318, the application computing platform 302 may generate a BGP message indicating that communications or network traffic (e.g., packets) originating from a range of network addresses and destined for a network address associated with the virtual machine 318 should be dropped. At step 2, the application computing platform 302 may send the BGP message comprising the drop action to one or more gateway network devices in communication with the application computing platform 302. For example, the application computing platform 302 may send, to the network devices 328, 330, and/or 332, the BGP message. At step 3, the application computing platform 302 may receive a request associated with an application executing on the application computing platform 302 from the computing device 308. For example, the application computing platform 302 may receive a request for a service associated with an application executing within the virtual machine 318. As denoted by the shaded regions over the lines extending from the network devices 328, 330, 332, and 322, the request may be communicated via the network devices 328, 330, 332, and 322.

At step 4, the application executing within the virtual machine 318 may invoke at least one call to an API of an OS running on the application computing platform 302. The at least one call to the API of the OS running on the application computing platform 302 may request opening of a network port for utilization by the application (e.g., a socket, bind, or connect call to an API of the OS, or the like). For example, the application executing within the virtual machine 318 may invoke one or more calls to an API of an OS executing within the virtual machine 318 requesting opening of a network port for utilization by the application executing within the virtual machine 318, and the OS executing within the virtual machine 318 may invoke one or more calls to an API of the virtualization OS 314 requesting opening of the network port for utilization by the application executing within the virtual machine 318. In some embodiments, invoking the at least one call to the API of the OS executing within the virtual machine 318 may include the application executing within the virtual machine 318 sending to the OS executing within the virtual machine 318 one or more parameters comprising a transport protocol for the requested network port (e.g., UDP, TCP, or the like), a source network address for the requested network port (e.g., a network address associated with the virtual machine 318), a source port number for the requested network port (e.g., a port number associated with the application executing within the virtual machine 318), a remote network address for the requested network port (e.g., a network address associated with the computing device 308), and/or a remote port number for the requested network port (e.g., a port number associated with an application executing on the computing device 308); and the OS executing within the virtual machine 318 sending to the virtualization OS 314 the parameter(s) comprising the transport protocol (e.g., UDP, TCP, or the like), the source network address (e.g., the network address associated with the virtual machine 318), the source port number (e.g., the port number associated with the application executing within the virtual machine 318), the remote network address (e.g., the network address associated with the computing device 308), and/or the remote port number (e.g., the port number associated with the application executing on the computing device 308).

Additionally or alternatively, invoking the at least one call to the API of the OS executing within the virtual machine 318 may include the application executing within the virtual machine 318 sending to the OS executing within the virtual machine 318 one or more parameters comprising a DSCP value for the requested network port (e.g., a DSCP value indicating that communications via the requested network port should be accorded an elevated level of QoS) and/or segment routing header information for the requested network port (e.g., segment routing header information indicating that communications via the requested network port should be routed via the network devices 328, 330, and 332); and the OS executing within the virtual machine 318 sending to the virtualization OS 314 the parameter(s) comprising the DSCP value (e.g., the DSCP value indicating that communications via the requested network port should be accorded an elevated level of QoS) and/or the segment routing header information (e.g., the segment routing header information indicating that communications via the requested network port should be routed via the network devices 328, 330, and 332).

At step 5, in response to the at least one call to the API of the OS running on the application computing platform 302 requesting opening of the network port, the application computing platform 302 may generate a request for opening the network port. For example, the application computing platform 302 may utilize the parameter(s) comprising the transport protocol, the source network address, the source port number, the remote network address, the remote port number, the DSCP value, and/or the segment routing header information to generate a request for opening the network port. The request may include the transport protocol, the source network address, the source port number, the remote network address, the remote port number, the DSCP value, and/or the segment routing header information. At step 6, the application computing platform 302 may send the request to the port management computing platform 306 (e.g., via the network devices 322 and 326).

Referring to FIG. 5B, at step 7, the port management computing platform 306 may utilize information from the request to make a determination regarding whether to open the network port. For example, the port management computing platform 306 may be provisioned with one or more rules indicating that a network port should be opened for a request comprising the transport protocol for the requested network port (e.g., UDP, TCP, or the like), a source network address associated with the virtual machine 318, a source port number associated with the application executing within the virtual machine 318, a remote network address associated with the computing device 308, and a remote port number associated with the application executing on the computing device 308. The port management computing platform 306 may determine, based on the one or more rules, that the requested network port should be opened. At step 8, the port management computing platform 306 may generate a response to the request (e.g., a response indicating that the network port should be opened). At step 9, the port management computing platform 306 may send the response to the application computing platform 302 (e.g., via the network devices 326 and 322).

At step 10, the application computing platform 302 may determine, based on the response, whether to open the network port. For example, the application computing platform 302 may determine, based on the response indicating that the network port should be opened, to open the network port. Responsive to determining to open the network port, at step 11, the application computing platform 302 may generate a BGP message comprising at least one network address associated with the application computing platform 302, at least one network address or port number associated with the network port for utilization by the application, and a forward action. For example, the application computing platform 302 may generate a BGP message indicating that communications or network traffic (e.g., packets) originating from a network address corresponding to the remote network address associated with the computing device 308, having a source port number corresponding to the remote port number associated with the application executing on the computing device 308, destined for a network address corresponding to the network address associated with the virtual machine 318, and having a remote port number corresponding to the source port number associated with the application executing within the virtual machine 318 should be forwarded. At step 12, the application computing platform 302 may send the BGP message comprising the forward action to one or more gateway network devices in communication with the application computing platform 302. For example, the application computing platform 302 may send, to the network devices 328, 330, and/or 332, the BGP message.

Referring to FIG. 5C, at step 13, the application computing platform 302 may open the network port. For example, the virtualization OS 314 may open the network port (e.g., a network port having the transport protocol for the requested network port (e.g., UDP, TCP, or the like), the source network address associated with the virtual machine 318, the source port number associated with the application executing within the virtual machine 318, the remote network address associated with the computing device 308, and the remote port number associated with the application executing on the computing device 308). At step 14, the API of the virtualization OS 314 may send to the application executing within the virtual machine 318 (e.g., via the API of the OS executing within the virtual machine 318) a value indicating that the network port has been opened (e.g., a value that the application will recognize as indicating that the requested network port has been opened). At step 15, the application executing within the virtual machine 318 and the application executing on the computing device 308 may communicate via the opened network port (e.g., via the network devices 328, 330, 332, and 322).

Figure 6:
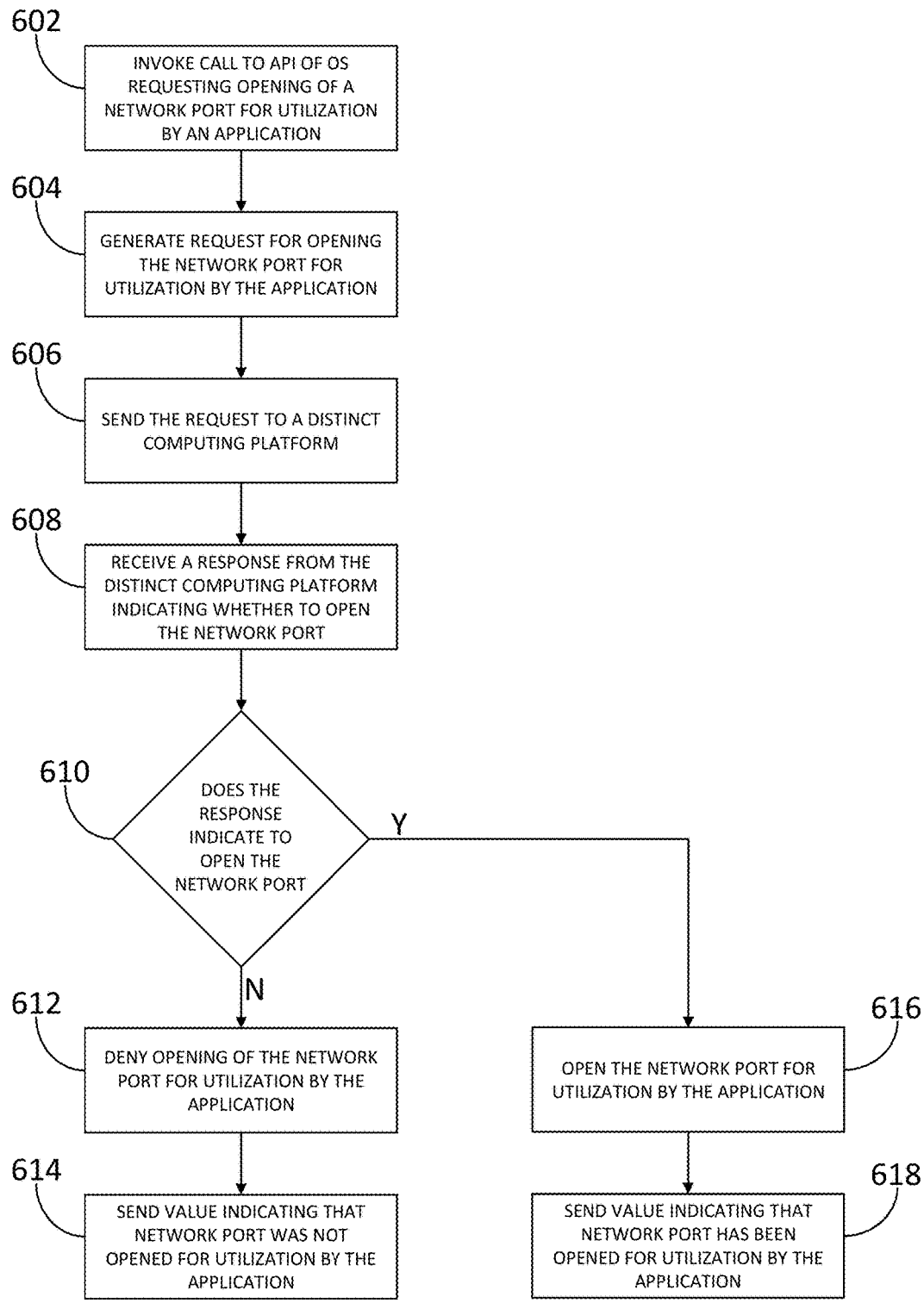
FIG. 6 depicts an illustrative method in accordance with one or more aspects of the disclosure.

FIG. 6 depicts an illustrative method in accordance with one or more aspects of the disclosure. Referring to FIG. 6, at a step 602, an application may invoke at least one call to an API of an OS running on a computing platform executing the application, and the at least one call may request opening of a network port for utilization by the application. For example, an application executing on the application computing platform 304 may invoke at least one call to an API of an OS running on the application computing platform 304 requesting opening of a network port for utilization by the application. At a step 604, a request for opening the network port for utilization by the application may be generated. For example, the application computing platform 304 may generate a request for opening the network port for utilization by the application executing on the application computing platform 304. At a step 606, the request may be sent to a computing platform distinct from the computing platform executing the application. For example, the application computing platform 304 may send the request to the port management computing platform 306. At a step 608, the computing platform executing the application may receive a response from the computing platform distinct from the computing platform executing the application. For example, the application computing platform 304 may receive a response to the request from the port management computing platform 306.

At a step 610, a determination may be made as to whether to open the network port based on whether the response indicates to open the network port. For example, the response may indicate not to open the network port, and the application computing platform 304 may determine not to open the network port. Responsive to determining not to open the network port, at a step 612, the computing platform executing the application may deny opening of the network port. For example, responsive to the application computing platform 304 determining not to open the network port, the application computing platform 304 may deny opening of the network port. At a step 614, the API of the OS running on the computing platform executing the application may send a value indicating that the network port was not opened. For example, the API of the OS running on the application computing platform 304 may send, to the application executing on the application computing platform 304, a value indicating that the network port was not opened.

Returning to the step 610, as indicated above, a determination may be made as to whether to open the network port based on whether the response indicates to open the network port. For example, the response to the request may indicate to open the network port, and the application computing platform 304 may determine to open the network port. Responsive to determining to open the network port, at a step 616, the computing platform executing the application may open the network port. For example, responsive to the application computing platform 304 determining to open the network, the application computing platform 304 may open the network port. At a step 618, the API of the OS running on the computing platform executing the application may send a value indicating that the network port has been opened. For example, the API of the OS running on the application computing platform 304 may send, to the application executing on the application computing platform 304, a value indicating that the network port has been opened.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure.

Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method comprising:
receiving, by a first computing platform via a network interface and from a computing device, a first request for a service associated with an application executing on the first computing platform;
generating, by at least one processor of the first computing platform and based on the first request, a second request for opening a network port for utilization by the application to enable communication with the computing device;
sending, by the first computing platform via the network interface, the second request to a second computing platform separate from the first computing platform;
receiving, by the first computing platform via the network interface and from the second computing platform, a response to the second request; and
determining, by the at least one processor of the first computing platform and based on the response to the second request, whether to open the network port.

2. The method of claim 1, further comprising:
invoking, by the application, at least one call to an application program interface (API) of an operating system (OS) running on the first computing platform, the at least one call requesting opening of the network port.

3. The method of claim 2, wherein invoking the at least one call comprises sending, by the application and via the at least one call, at least one of:
one or more parameters comprising a transport protocol for the network port,
a source network address for the network port,
a source port number for the network port, and
a remote network address for the network port, and a remote port number for the network port.

4. The method of claim 3, wherein generating the second request comprises utilizing the one or more parameters, and wherein the second request comprises at least one of:
the transport protocol,
the source network address,
the source port number,
the remote network address, and
the remote port number.

5. The method of claim 2, wherein invoking the at least one call comprises sending, by the application and via the at least one call, one or more parameters comprising a differentiated services code point (DSCP) value indicating a quality of service (QoS) level for communications via the network port, wherein generating the second request comprises utilizing the DSCP value, and wherein the second request comprises the DSCP value.

6. The method of claim 2, wherein invoking the at least one call comprises sending, by the application and via the at least one call, one or more parameters comprising segment routing header information indicating a plurality of network devices to use for routing communications via the network port, wherein generating the second request comprises utilizing the segment routing header information, and wherein the second request comprises the segment routing header information.

7. The method of claim 2, wherein the OS running on the first computing platform is a virtualization OS configured to host a plurality of virtual machines, the method further comprising:
hosting, by the virtualization OS, the plurality of virtual machines; and
executing the application within one of the plurality of virtual machines.

8. The method of claim 7, wherein invoking the at least one call comprises:
invoking, by the application, at least one call to an API of an OS executing within the one of the plurality of virtual machines; and
invoking, by the OS executing within the one of the plurality of virtual machines, the at least one call to the API of the OS running on the first computing platform.

9. The method of claim 8, wherein invoking the at least one call to the API of the OS executing within the one of the plurality of virtual machines comprises sending, by the application and to the OS executing within the one of the plurality of virtual machines one or more parameters comprising at least one of:
a transport protocol for the network port,
a source network address for the network port,
a source port number for the network port,
a remote network address for the network port, and
a remote port number for the network port.

10. The method of claim 8, wherein invoking the at least one call to the API of the OS executing within the one of the plurality of virtual machines comprises sending, by the application and to the OS executing within the one of the plurality of virtual machines, one or more parameters comprising segment routing header information for the network port; and
wherein invoking the at least one call to the API of the OS running on the first computing platform comprises sending, by the OS executing within the one of the plurality of virtual machines and to the OS running on the first computing platform, the one or more parameters comprising the segment routing header information for the network port.

11. The method of claim 2, further comprising:
responsive to determining to open the network port:
opening, by the OS, the network port; and
sending, by the API and to the application, a value indicating that the network port has been opened.

12. The method of claim 2, further comprising:
responsive to determining not to open the network port:
denying, by the OS, opening of the network port; and
sending, by the API and to the application, a value indicating that the network port was not opened.

13. The method of claim 1, further comprising:
generating, by the first computing platform, a first border gateway protocol (BGP) message comprising a network address associated with the first computing platform and a drop action;
sending, by the first computing platform and to at least one gateway network device, the first BGP message; and
responsive to determining to open the network port:
generating, by the first computing platform, a second BGP message comprising the network address, a port number associated with the network port, and a forward action; and sending, by the first computing platform and to the at least one gateway network device, the second BGP message.

14. The method of claim 13, wherein the OS is a virtualization OS configured to host a plurality of virtual machines; and wherein the first BGP message comprises a network address of a virtual machine of the plurality of virtual machines.

15. A method comprising:
receiving, by a first computing platform via a network interface and from a second computing platform, a request for opening a network port for utilization by an application executing on the second computing platform to enable communication with a computing device that requested a service associated with the application;
determining, by at least one processor of the first computing platform, based on information associated with the request, whether to open the network port; and
sending, by a first computing platform via the network interface and to the second computing platform, a response to the request indicating the determination.

16. The method of claim 15, wherein the information associated with the request comprises at least one provisioned rule indicating whether the network port should be opened.

17. The method of claim 15, wherein the information associated with the request is associated with at least one of: time of day and network load.

18. A method comprising:
receiving, by a first computing platform via a network interface and from a second computing platform, a first request for opening a network port for utilization by an application executing on the second computing platform to enable communication by the second computing platform with a computing device;
determining, by at least one processor of the first computing platform, based on information associated with the first request, whether to open the network port;
generating, by the at least one processor of the first computing platform, a response to the first request indicating the determination;
sending, by the first computing platform via the network interface and to the second computing platform, the response.

19. The method of claim 18, further comprising:
receiving, by the second computing platform via a second network interface and from the computing device, a second request for a service associated with the application;
invoking, by the application, at least one call to an application program interface (API) of an operating system (OS) running on the second computing platform, the at least one call requesting opening of the network port;
generating, by at least one processor of the second computing platform, based on the application invoking the at least one call, the first request; and
sending, by the second computing platform via the second network interface and to the first computing platform, the first request.

20. The method of claim 19, wherein the OS running on the second computing platform is a virtualization OS configured to host a plurality of virtual machines, the method further comprising:
hosting, by the virtualization OS, the plurality of virtual machines; and
executing the application within one of the plurality of virtual machines.

* * * * *